(12) United States Patent
Blount et al.

(10) Patent No.: US 10,372,473 B2
(45) Date of Patent: *Aug. 6, 2019

(54) SENSOR VIRTUALIZATION THROUGH CLOUD STORAGE AND RETRIEVAL MECHANISMS

(71) Applicant: International Business Machines Corporation, Armonk, NY (US)

(72) Inventors: Marion L. Blount, Mahopac, NY (US); Metin Feridun, Thalwil (CH); Suzanne K. McIntosh, Clifton, NJ (US); Iqbal I. Mohomed, Stamford, CT (US); Michael E. Nidd, Zurich (CH); Axel Tanner, Kilchberg (CH); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 577 days.

This patent is subject to a terminal disclaimer.

(21) Appl. No.: 15/089,761

(22) Filed: Apr. 4, 2016

(65) Prior Publication Data
US 2016/0216999 A1    Jul. 28, 2016

Related U.S. Application Data

(63) Continuation of application No. 13/571,780, filed on Aug. 10, 2012, now Pat. No. 9,304,511, which is a
(Continued)

(51) Int. Cl.
G06F 9/455    (2018.01)
G05B 23/02    (2006.01)
(Continued)

(52) U.S. Cl.
CPC ......... *G06F 9/45558* (2013.01); *G01D 18/00* (2013.01); *G05B 19/406* (2013.01); *G05B 23/0221* (2013.01); *G05B 2219/37537* (2013.01)

(58) Field of Classification Search
CPC .............. G05B 23/0221; G05B 19/406; G05B 2219/37537; G01D 18/00; G06F 9/45558
See application file for complete search history.

(56) References Cited

U.S. PATENT DOCUMENTS 6,697,879 B1    2/2004    Tufty et al.
6,697,897 B1    2/2004    Friel et al.
(Continued)

OTHER PUBLICATIONS

U.S. Appl. No. 13/551,745.
(Continued)

*Primary Examiner* — Yoshihisa Ishizuka
(74) *Attorney, Agent, or Firm* — Stephen J. Walder, Jr.; Grant Johnson

(57) ABSTRACT

Mechanisms are provided for virtualizing physical sensors and providing sensor data to a requestor using the virtualized physical sensors. The mechanisms obtain sensor data from a plurality of physical sensors and storing the sensor data in a virtual sensor storage system of the data processing system in at least one standardized format. A request from a requestor for a first type of sensor data is received which does not specify a particular physical sensor. A portion of the sensor data stored in the virtual sensor storage system is retrieved in response to receiving the request, the portion of sensor data corresponding to the type of sensor data requested in the request from the requestor. The retrieved portion of the sensor data is returned to the requestor in a format corresponding to a physical sensor configured to provide the requested type of sensor data.

15 Claims, 5 Drawing Sheets

Related U.S. Application Data continuation of application No. 13/551,745, filed on Jul. 18, 2012, now Pat. No. 9,256,222.

(51) Int. Cl.
  *G01D 18/00* (2006.01)
  *G05B 19/406* (2006.01)

(56) References Cited

U.S. PATENT DOCUMENTS

| | | | |
|---|---|---|---|
| 6,772,099 | B2 | 8/2004 | Merkin et al. |
| 6,904,391 | B2 | 6/2005 | Merkin et al. |
| 7,787,969 | B2 * | 8/2010 | Grichnik ............ G05B 19/0423 700/110 |
| 8,725,680 | B2 | 5/2014 | Abraham et al. |
| 9,256,222 | B2 | 2/2016 | Blount et al. |
| 2004/0133398 | A1 * | 7/2004 | Merkin ............... G06F 11/3006 702/188 |
| 2004/0254767 | A1 | 12/2004 | Merkin et al. |
| 2007/0239399 | A1 * | 10/2007 | Sheynblat ............... G06F 9/542 702/187 |
| 2008/0042830 | A1 * | 2/2008 | Chakraborty ........ G06K 7/0008 340/540 |
| 2009/0216827 | A1 | 8/2009 | Hirase et al. |
| 2010/0229082 | A1 | 9/2010 | Karmarkar et al. |
| 2011/0153276 | A1 | 6/2011 | Lee et al. |
| 2012/0323343 | A1 | 12/2012 | Grichnik et al. |
| 2013/0173028 | A1 * | 7/2013 | Felty ..................... G05B 13/02 700/79 |
| 2014/0012791 | A1 | 1/2014 | Grichnik et al. |
| 2014/0025338 | A1 | 1/2014 | Blount et al. |

OTHER PUBLICATIONS

U.S. Appl. No. 13/571,780.

Liu, Yong et al., "A Provenance-Aware Virtual Sensor System Using the Open Provenance Model", 2010 International Symposium on Collaborative Technologies and Systems (CTS), May 17-21, 2010, pp. 330-339.

Microstrain, Inc. "SensorCloud Open Data API", downloaded from the Internet, Jan. 24, 2011, http://sensorcloud.com/sites/default/files/SensorCloud-OpenDataAPI_8-2-2011_0_0.pdf, last modified Aug. 2, 2011, 34 pages.

Nakamura, Masahide et al., "Application Framework for Efficient Development of Sensor as a Service for Home Network System", 2011 IEEE International Conference on Services Computing (SCC), Jul. 4-9, 2011, pp. 576-583.

Satoh, Fumiko et al., "Cloud-based Infrastructure for Managing and Analyzing Environmental Resources", 2011 Annual SRII Global Conference (SRII), Mar. 29, 2011-Apr. 2, 2011, pp. 325-334.

Yuriyama, Madoka et al., "Sensor-Cloud Infrastructure-Physical Sensor Management with Virtualized Sensors on Cloud Computing", 2010 13th International Conference on Network-Based Information Systems (NBIs) Sep. 14-16, 2010, 8 pages.

* cited by examiner

SENSOR VIRTUALIZATION THROUGH CLOUD STORAGE AND RETRIEVAL MECHANISMS

This application is a continuation of application Ser. No. 13/571,780, filed Aug. 10, 2012, status awaiting publication.

BACKGROUND

The present application relates generally to an improved data processing apparatus and method and more specifically to mechanisms for providing sensor virtualization for abstracting physical sensors that provide data to applications by using cloud storage and retrieval mechanisms.

Many consumer electronics today comprise a variety of sensors for detecting various conditions and providing data to applications indicative of the sensed conditions. For example, electronic devices may be equipped with motion sensors, accelerometers, light sensors, radio frequency identifier (RFID) sensors, barometers, hygrometers, and the like.

Recently, there have been mechanisms devised for virtualizing these sensors so as to optimize the sensors for the particular applications with which they are utilized. For example, as described in Hirase et al., U.S. Patent Application Publication No. 2009/0216827, published Aug. 27, 2009, these mechanisms address the problem that sensors are not always optimized for the existing application software that uses the sensor data and to address the problem of incorporating programming code for sensor control into the application software. The Hirase mechanism provides sensor manager that receives instructions from applications, judges whether sensor output meets the requirements of the received instruction and, if so, generates an interrupt to the application submitting the instruction. Thus, in Hirase, the received instructions themselves are the "virtual sensors" which essentially operate as a filter on the sensor output. Thus, with Hirase, sensor output that does not meet the requirements of the conditions of the received instruction is suppressed.

SUMMARY

In one illustrative embodiment, a method, in a data processing system, is provided for virtualizing physical sensors and providing sensor data to a requestor using the virtualized physical sensors. The method comprises obtaining, in the data processing system, sensor data from a plurality of physical sensors and storing the sensor data in a virtual sensor storage system of the data processing system in at least one standardized format. The method comprises receiving, in the virtual sensor storage system, a request from a requestor for a first type of sensor data. The request does not specify a particular physical sensor. The method also comprises retrieving, by the virtual sensor storage system, a portion of the sensor data stored in the virtual sensor storage system in response to receiving the request. The portion of sensor data corresponds to the type of sensor data requested in the request from the requestor. Moreover, the method comprises returning, by the virtual sensor storage system, the retrieved portion of the sensor data to the requestor in a format corresponding to a physical sensor configured to provide the requested type of sensor data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
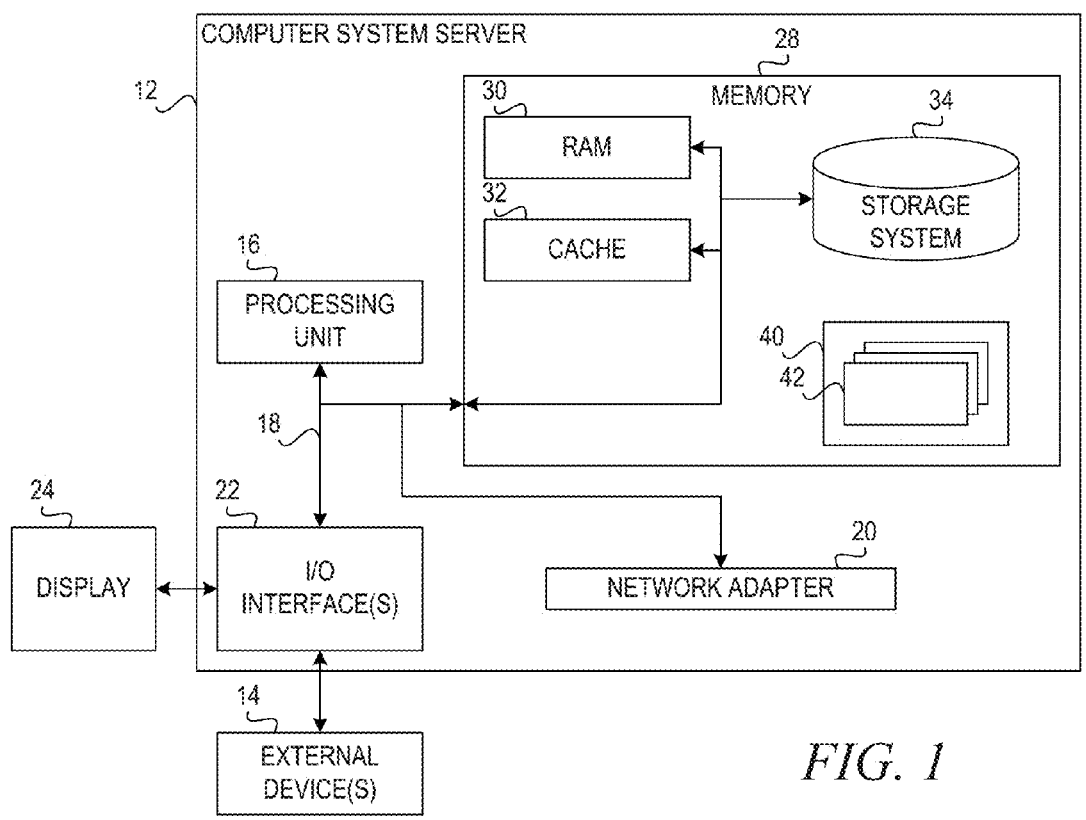
FIG. 1 is a schematic of an example of a cloud computing node in accordance with one illustrative embodiment.

As noted above, many electronic devices make use of sensor data, and applications operating on such sensor data, to perform various functions. However, for a variety of reasons, the availability of a given sensor cannot be relied upon. For example, a sensor may become disabled due to a hardware fault, damage, or lack of power, i.e. unexpected events that require human intervention to bring the sensor back online. Alternatively, sensor outages may be planned, e.g., a sensor may come online periodically and stay on for a limited amount of time in order to conserve battery power. At any rate, whether planned or unexpected, there are times that an application cannot rely on the availability of physical sensors to perform its functions.

Also, as mentioned above, sensor virtualization mechanisms have been devised, such as described in the above referenced Hirase et al. Patent Application Publication No. 2009/0216827, for setting filter conditions on sensor output so that only the sensor output matching the filter conditions is returned to the application that created the virtual sensor. This "virtualization" of sensors is in actuality just a filter of the sensor output from the physical sensors rather than actually providing any virtualization of the sensors themselves. Moreover, such mechanisms suppress data not meeting the conditions of the filter and are susceptible to sensor outages or unavailability.

Contrary to these filtering mechanisms, the illustrative embodiments provide mechanisms for virtualizing sensors using cloud computing mechanisms. That is, the illustrative embodiments leverage cloud computing technology to absorb sensor data and to provide tools for virtualizing sensors. As a result, applications on computing devices communicating with the cloud computing mechanisms of the illustrative embodiments are relieved of the task of providing a variety of interfaces to a variety of physical sensors. Moreover, the mechanisms of the illustrative embodiments are not susceptible to the problems associated with the unavailability of specific physical sensors due to the fact that the mechanisms of the illustrative embodiments provide a true virtualization of physical sensors via the cloud computing resources.

The illustrative embodiments provide three primary mechanisms for providing the cloud computing based virtualization of sensors mentioned above. First, the illustrative embodiments provide a standardized interface through which applications can request and obtain sensor data from virtualized sensors via cloud computing resources. Second, the illustrative embodiments provide a standardized interface by which physical sensors can post sensor data to cloud computing resources for retrieval by applications. Third, the illustrative embodiments provide mechanisms for implementing an organized storage of sensor data so as to facilitate the retrieval of sensor data pertinent to requests from applications via cloud computing mechanisms.

With regard to the first mechanism for providing a standardized interface through which applications can request and obtain sensor data from virtualized sensors via cloud computing resources, a standardized set of application program interfaces (APIs) are provided that have input parameters and returned results consistent with the target physical sensor from which applications are requesting sensor data. That is, the cloud computing resources include APIs that operate as virtual sensors to which the applications may submit a request for a particular type of data as specified by input parameters and can expect results to be provided in a manner and format consistent with the type of output actually provided by the physical sensor such that it is transparent to the application as to whether the sensor data is being provided by the cloud computing based virtualized sensors or from actual physical sensors.

For example, one of the standardized APIs may be an API for requesting current temperature data for a user-defined range of latitudes and longitudes. In response to a request from an application for such temperature data, the request including input parameters indicating the latitudes/longitudes as well as other input parameters, the API may return an array of temperature data values ordered first by increasing latitude and then by increasing longitude, or organized according to a user specified preference in the input parameters. The API may further allow the user to specify additional conditions of the request including requesting that the sensor data be interpolated with a user-specified granularity and indicate how the interpolated sensor data may be organized in the returned results. Such interpolation may be a processor intensive operation dependent on the size of the field over which the interpolation occurs and thus, the API may further allow a user to select a rate of return (ROR) where the higher the ROR, the faster the user wants a response. If the user specifies a ROR=highest, then the APIs of the cloud computing mechanisms can direct the interpolation phase of the request to be completed on the fastest computing platform that the cloud computing mechanism have at their disposal, e.g., a super computing platform with a math library that can perform ultra-fast interpolation.

It should be noted that since a standardized set of APIs are provided in the cloud computing mechanisms of the illustrative embodiments, when requesting sensor data from the cloud computing mechanisms of the illustrative embodiments, the APIs allow applications to request only the parameters of the sensor data that the application needs without having to specify a particular physical sensor be read. That is, in the request, the application specifies only the type of sensor data the application wants returned, any operations to be performed on the sensor data, and the format of the returned data, and the like. The cloud computing mechanisms of the illustrative embodiments, hereafter referred to as the Sensor Cloud, will locate the sensor data that matches the requested type of sensor data by searching through its stored sensor data logs, performs the requested operations on the found sensor data, and returns the processed sensor data to the requesting application in the requested format. It should be appreciated that this sensor data may all come from the same physical sensor or a plurality of physical sensors associated with different electronic devices. The application does not know what physical sensors are providing the sensor data only that the requested sensor data is returned from the Sensor Cloud.

The Sensor Cloud may further provide authentication mechanisms for authenticating an application, or a user of an application, before providing the requested sensor data. Once authenticated, the application/user may be granted access to the requested sensor data for which it/they are authorized.

With regard to the second primary mechanism of the illustrative embodiments, a standardized interface by which physical sensors can post sensor data to cloud computing resources for retrieval by applications is provided. To provide this standardized interface, the Sensor Cloud provides a set of standard APIs which conform to the interface requirements of a variety of physical sensors. The physical sensors themselves, or at least the data processing devices with which the physical sensors are associated, are configured to send their output data to the Sensor Cloud to be time stamped, logged, and made available to authorized applications/users.

The sensor data stored by the Sensor Cloud mechanisms may be obtained from a variety of different physical sensors associated with a variety of different data processing systems, electronic devices, or the like, which communicate this data with the Sensor Cloud via corresponding ones of the standard APIs. The providers of such sensor data may stipulate constraints on the way in which the sensor data may be consumed by applications/users and/or may constrain which applications/users, types of applications/users, or the like, can obtain access to the sensor data provided. This constraint information may be stored in association with the sensor data provided by the provider to the Sensor Cloud.

For example, physical sensors deployed by various organizations/individuals/companies, or the like, may contribute their sensor data for open use by the greater community of users/applications via the Sensor Cloud mechanisms of the illustrative embodiments using the standard APIs provided by the Sensor Cloud. Environmental organizations, academia, government organizations, and the like, may openly provide their sensor data without constraint, for example. Other types of organizations, such as corporations, business, or the like, may prefer to place constraints on access to the sensor data that they provide to the Sensor Cloud and thus, can specify these constraints in association with the physical sensors when configuring the physical sensors to communication with the Sensor Cloud. Such constraints would then be associated with the sensor data provided by that organization's sensors.

Regarding the third primary mechanism of the illustrative embodiments, mechanisms for implementing an organized storage of sensor data so as to facilitate the retrieval of sensor data pertinent to requests from applications via cloud computing mechanisms are provided. To implement these storage mechanisms, the Sensor Cloud maintains current sensor data as well as historic sensor data as storage space permits. The Sensor Cloud accepts sensor data from a variety of different sensors of a variety of different sensor types. The sensor data may be obtained from a variety of different sensor types in a variety of different formats via the standard APIs, but may store the received data in a uniform standard format within the storage system of the Sensor Cloud for ease of retrieval. This standardized format may be standardized across all types of sensors or may be a different standardized format for particular categories or types of sensors, e.g., temperature sensors have a first standardized format while voltage sensors have a second standardized format different from the first standardized format. In either case, the different formats of sensor data from actual physical sensors may be converted to a standardized format associated with a virtual sensor which facilitates searching of the sensor data based on sensor data type and other search criteria corresponding to requests for sensor data from the Sensor Cloud.

The variety of different sensors may have overlapping sensor data. Such redundancy can be leveraged by the Sensor Cloud to detect sensors that appear to be unreliable based on comparison with nearby sensors of a same type. That is, for example, by comparing sensor data obtained from nearby physical sensors, if a majority of these nearby physical sensors are measuring values within a particular range and another nearby physical sensor measures a value that is an extreme outlier, from this range, then it can be determined that the physical sensor measuring the extreme outlier value is most likely unreliable or otherwise operating in a faulty manner, if at all. In addition, the Sensor Cloud can provide a thinning function to remove or compress redundant data.

With these mechanisms of the Sensor Cloud, sensor data from a variety of different physical sensors associated with the same or different data processing devices, electronic devices, or the like, may be received into the Sensor Cloud and used to represent data output by virtualized sensors. Applicants may request sensor data from the Sensor Cloud without specifying a particular physical sensor from which the data is to be retrieved. Standardized APIs permit such communication between applications and the Sensor Cloud as well as communication between the physical sensors and the Sensor Cloud. A standardized organized storage mechanism permits such APIs to access sensor data obtained from a variety of different physical sensors in a uniform manner. As a result, the mechanisms of the illustrative embodiments provide a true virtualized sensor mechanism in which applications are not as susceptible to unavailability of particular physical sensors. With the mechanisms of the illustrative embodiments, the virtual sensors are defined internal to the Sensor Cloud and not specified as filter conditions by the particular applications requesting the sensor data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
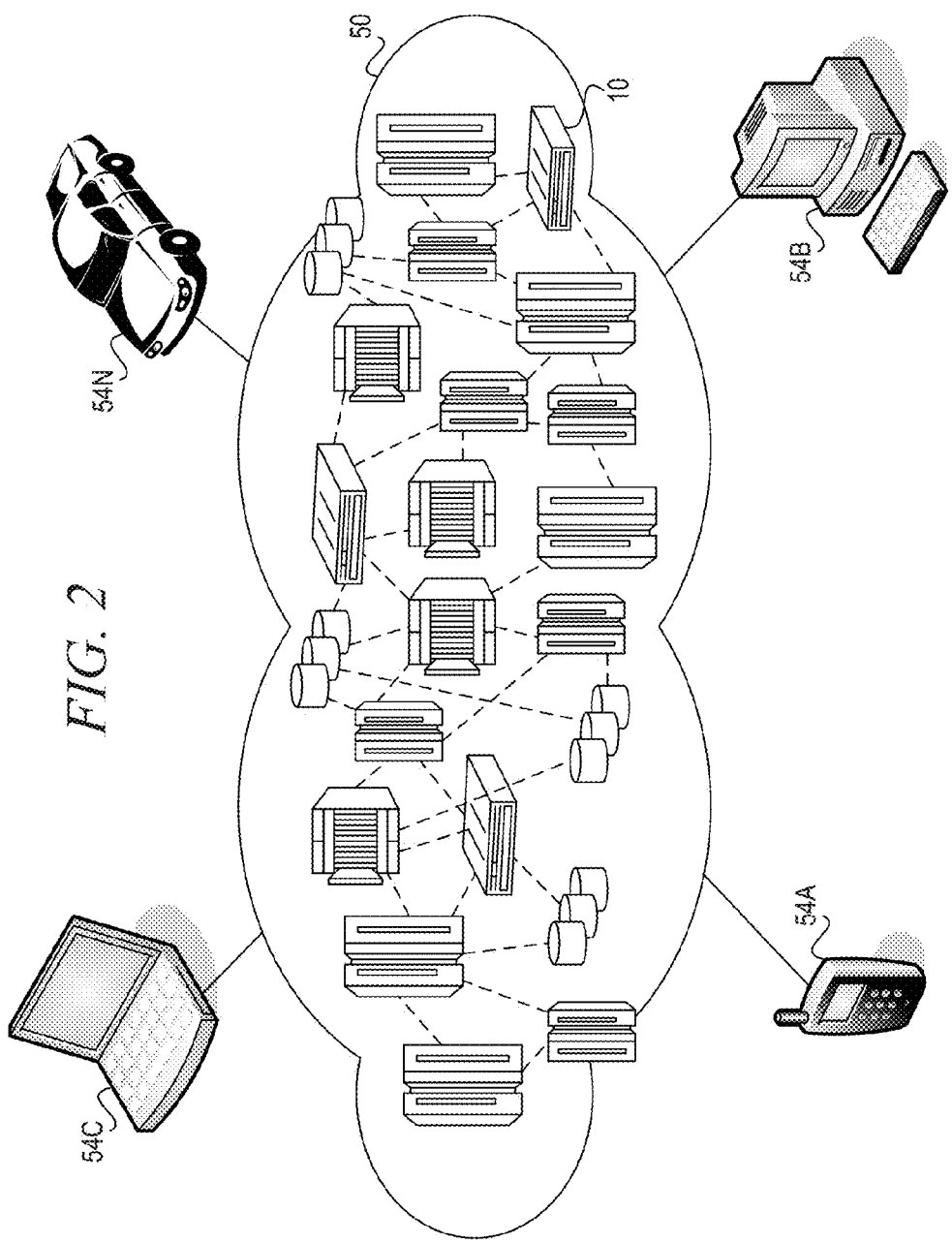
FIG. 2 is an example of a cloud computing environment in which aspects of the illustrative embodiments may be implemented.
Figure 3:
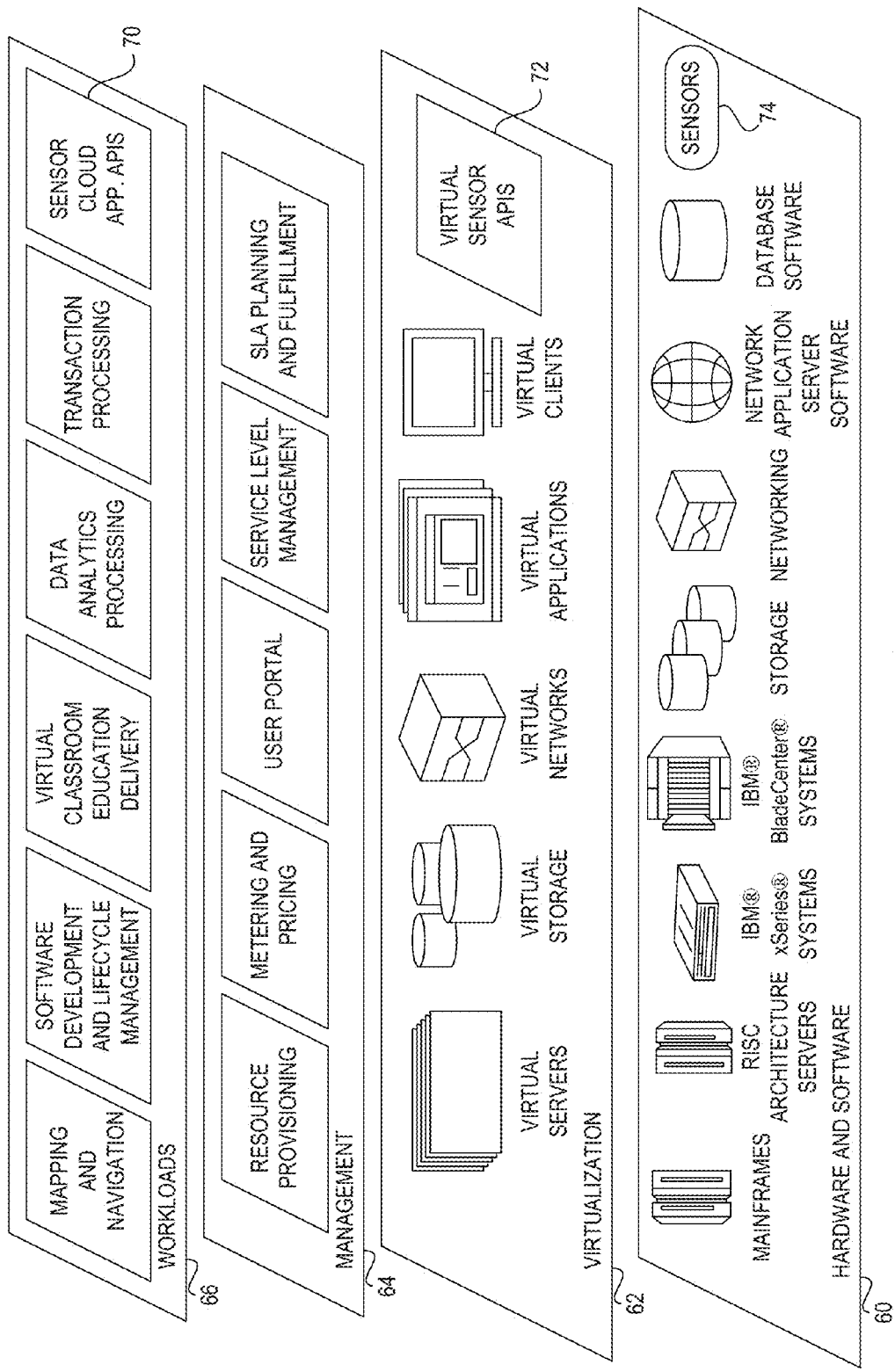
FIG. 3 is an example diagram of a set of functional abstraction layers provided by a cloud computing environment in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

It should be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

With regard to the specific mechanisms of the illustrative embodiments, various layers of the cloud computing system may provide various ones of the mechanisms of the illustrative embodiments. For example, as shown in FIG. 3, the physical sensors that provide sensor data for responding to application requests may be provided in the hardware and software layer 60 along with the storage hardware and software necessary for storing the sensor data. The application programming interfaces (APIs) for virtualizing the physical sensors may be provided in the virtualization layer 62 for providing APIs through which the various sensors in the hardware and software layer 60 may communicate with the Sensor Cloud mechanisms of the illustrative embodiments. The APIs for communicating with applications/users may be provided in the workloads layer 66. Various management operations for managing the Sensor Cloud may be provided in the management layer 64. It should be appreciated that while portions of the Sensor Cloud mechanisms are depicted in various layers of the cloud computing system, the illustrative embodiments are not limited to this particular arrangement of elements and elements of the Sensor Cloud mechanisms of the illustrative embodiments may be presented in various other layers without departing from the spirit and scope of the illustrative embodiments.

Figure 4:
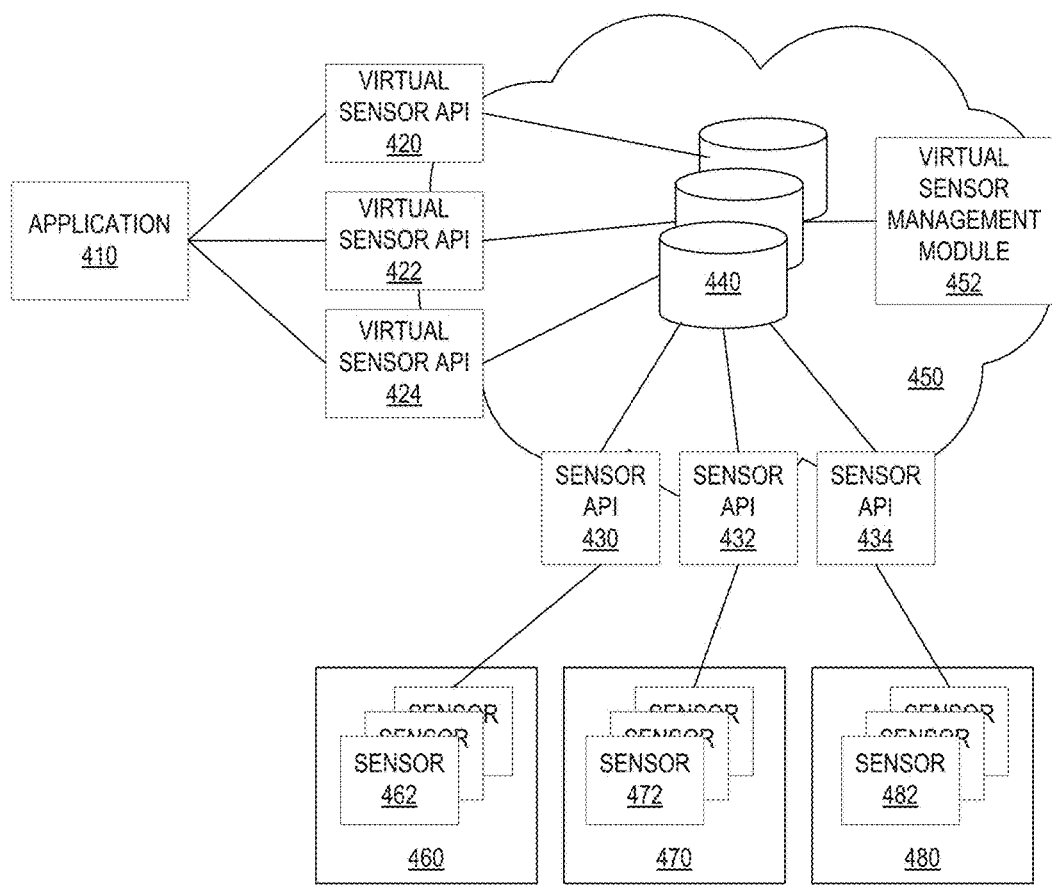
FIG. 4 is an example block diagram illustrating the interaction and operation of the primary operational elements of the Sensor Cloud mechanisms of the illustrative embodiments.

FIG. 4 is an example block diagram illustrating the interaction and operation of the primary operational elements of the Sensor Cloud mechanisms of the illustrative embodiments. The elements shown in FIG. 4 may be implemented as software instructions executed on one or more data processing devices, e.g., processors and memories, for example. In some illustrative embodiments, these data processing devices may be provided as client computing devices, server computing devices such as shown in FIG. 1, or the like.

As shown in FIG. 4, a plurality of environments 460-480 may be equipped with one or more physical sensors 462, 472, and 482. The plurality of environments 460-480 may comprise one or more data processing systems, computing devices, electronic devices, and/or the like. These devices may have the physical sensors 462, 472, and 482 deployed in these devices or otherwise provided in association with these devices. The physical sensors 462, 472, and 482 may be provided with a communication mechanism themselves, or via the devices with which they are associated, for communicating with the Sensor Cloud mechanisms 500 of the illustrative embodiments. Specifically, the Sensor Cloud mechanisms provide various sensor APIs 430-434 for different types of physical sensors. These sensor APIs 430-434 provide a standardized interface through which the physical sensors 462, 472, and 482 communicate their sensor data to the physical sensor data storage system 440. The sensor APIs 430-434 recognize the format of data received from the physical sensors 462, 472, and 482 that they are configured to communicate with. The physical sensors 462, 472, and 482 themselves, or the devices with which they are associated, are configured to specifically call the particular sensor API 430-434 that corresponds to the type of physical sensor

462, 472, and 482. Thus, for example, if sensor 462 is a temperature sensor of a first type T1, and sensor API 430 is specifically configured to work with temperature sensors of type T1, then the sensor 462 or its associated device is configured to specifically call the sensor API 430 when communicating sensor data to the sensor data storage system 440.

To further illustrate possible implementations of the sensor APIs 430-434, consider the following example sensor API:
getSensorReadings(
sensorType (e.g. temperature, CO2, snowfall, etc.)
startingLattitude,
startingLongitude,
endingLattitude,
endingLongitude,
startingElevation (include unit of measure),
endingElevation (include unit of measure),
startDate,
endDate,
averagingPeriod (e.g. minutes, hourly, daily, weekly, monthly, etc.),
interpolation (interpolate temperature to the inch, centimeter, foot, meter, yard, etc.)
RoR (useful if interpolation is selected))

This example sensor API may be invoked as follows, for example: K2_Temperatures=getSensorReadings(temperatureSensor, 35.891811, 76.4994487, 35.8954139, 76.5189876, 5400 meters, 8611 meters, 1909, 2012, weekly). Note that data for periods of time which pre-date the advanced sensing technology used today may be requested. In those cases, the illustrative embodiments attempt to find the data either in its preload store, or in other available sources.

In a similar manner, the virtual sensor management module 452, may communicate with the physical sensors 462, 472, and 482 and/or their associated devices, for purposes of requesting sensor data, configuring the physical sensors, or performing other management operations for managing the Sensor Cloud with which the physical sensors 462, 472, and 482 are associated. The sensor APIs 430-434 may provide an interface for facilitating such communication, or other similar sensor APIs (not shown) may be provided for such communication.

The received sensor data from the physical sensors 462, 472, and 482, received via the sensor APIs 430-434, is processed by the virtual sensor management module 452 in combination with the sensor data storage system 440 so as to store the sensor data in a standardized organized manner in the sensor data storage system 440 so that it is retrievable by applications via virtual sensor APIs 420-424. The standardized organized format for the sensor data may be general for all sensor data or may comprise separate standardized organized formats for different types of sensors, e.g., temperature sensors having a first format, voltage sensors having a second format, audio sensors having a third format, etc. The virtual sensor management module 452 may receive the raw physical sensor data from the sensors 462, 472, and 482 via the sensor APIs 430-434 and may process the sensor data to format it into the standardized organized format. The resulting formatted physical sensor data may then be stored in the sensor data storage system 440 along with other characteristic information regarding the particular physical sensors 462, 472, and 482 from which the sensor data was received, the environments 460-480 from which the sensor data was received, any limitations on the use of the sensor data, e.g., particular types of applications, users, or the like, that can retrieve the stored sensor data, and/or the like.

With the standardized storage format for sensor data, various labels or other identifiers may be associated with the raw sensor data during the capture of the raw sensor data by the physical sensors and provided along with the raw sensor data from the physical sensors. These labels or identifiers may be used as a basis for storing the data into various fields of the standardized format so as to facilitate rapid searching of sensor data. The sensor data may be stored in a traditional database type storage, a federated database, or the like.

Applications, such as application 410, request sensor data from the Sensor Cloud 450 by sending requests to a corresponding virtual sensor API 420-424 of the Sensor Cloud 450, The requests from the application 410 are general requests for a type of sensor data and do not specify any particular physical sensor 462, 472, or 482, or if the request has such a request for a specific physical sensor, it is ignored by the virtual sensor API 420-424 to which the request is transmitted. The application 410 is configured to call a particular virtual sensor API 420-424 corresponding to the type of physical sensor data that the application 410 is requesting.

The virtual sensor APIs 420-424 act as the virtual sensor of the particular type corresponding to the type of physical sensor data requested by the application 410. Thus, from the view of the application 410, the application is requesting a particular physical sensor data from a generic physical sensor that is virtualized by the virtual sensor API 420-424. The virtual sensor APIs 420-424 are configured to return resulting sensor data retrieved from the sensor data storage system 440 in a format corresponding to that of the physical sensors 462, 472, and 482 of the type corresponding to the type of sensor data retrieved. Thus, again, from the view of the application 410, the application 410 is receiving the requested data from a generic physical sensor of the type corresponding to the type of physical sensor data requested. In actuality, the sensor data may be obtained from any of a number of different physical sensors 462, 472, or 482 corresponding to the type of physical sensor data requested. Thus, the physical sensor data may in actuality be a combination of physical sensor data from a plurality of different physical sensors of the type corresponding to the type of physical system data requested, rather than being only from one particular physical sensor.

The following is an example of a virtual sensor API illustrating one possible implementation of a virtual sensor API 420-424. This is only an example and is not intended to limit the particular implementations of types of virtual sensor APIs that may be used with the mechanisms of the illustrative embodiments.
putRawSensorReading(
mySensorType (e.g. temperature, CO2, snowfall, etc.)
lattitude,
longitude,
elevation (include unit of measure),
date)

Such a virtual sensor API may be invoked using the following example statement putRawSensorReading(temperatureSensor, 35.891811, 76.4994487, 8611 meters, 31 Jul. 1954). This raw sensor data is placed in the virtual sensor storage and is searchable via any of the labels that were provided as parameters, for example lattitude, longitude, elevation, date.

Thus, the Sensor Cloud 450 includes virtual sensor APIs 420-424 that operate as virtual sensors to which the application 410 may submit a request for a particular type of sensor data as specified by input parameters and can expect results to be provided in a manner and format consistent with the type of output actually provided by the physical sensor 462, 472, and 482, such that it is transparent to the application 410 as to whether the sensor data is being provided by the Sensor Cloud 450 based virtualized sensors, as defined by the virtual sensor APIs 420-424, or from actual physical sensors 462, 472, and 482.

As an example, one of the virtual sensor APIs 420-424 may be an API for requesting current temperature data for a user-defined range of latitudes and longitudes, as previously discussed above. In response to a request from an application 410 for such temperature data, the request including input parameters indicating the latitudes/longitudes as well as other input parameters, the API 420 may return an array of temperature data values ordered first by increasing latitude and then by increasing longitude, or organized according to a user specified preference in the input parameters. The API 420 may further allow the user to specify additional conditions of the request including requesting that the sensor data be interpolated with a user-specified granularity and indicate how the interpolated sensor data may be organized in the returned results, as previously discussed above.

The virtual sensor APIs 420-424 allow the application 410 to request only the parameters of the sensor data that the application 410 needs without having to specify a particular physical sensor 462, 472, or 482, be read. That is, in the request, the application 410 specifies only the type of sensor data the application wants returned, any operations to be performed on the sensor data, and the format of the returned data, and the like. The virtual sensor management module 452 and/or sensor data storage system 440, either alone or in combination, provide a searching tool to search the stored sensor data logs of the storage system 440 for the sensor data corresponding to the requested sensor data type. If the application 410 requested a particular operation to be performed on the found data, e.g., ordering of the sensor data, averaging of the sensor data, or any other type of operation, the virtual sensor management module 452 or the mechanisms of the storage system 440 perform the requested operations on the found sensor data and return the processed sensor data to the requesting application 410 in the requested format. As noted above, it should be appreciated that this sensor data may all come from the same physical sensor 462, 472, or 482, or a plurality of physical sensors associated with different electronic devices in different environments 460, 470, and 480. The application 410 does not know what physical sensors 462, 472, or 482 are providing the sensor data only that the requested sensor data is returned from the Sensor Cloud 450.

The virtual sensor management module 452 may further provide authentication mechanisms for authenticating an application 410, or a user of an application 410, before providing the requested sensor data. Once authenticated, the application/user may be granted access to the requested sensor data for which it/they are authorized. If the application 410 and/or user is not authenticated, or is not authenticated for the particular sensor data requested, then a denial response may be returned to the requesting application 410 and/or user.

In addition, as mentioned above, some sources of sensor data may have limiting criteria for the retrieval of this sensor data for use by requesting applications 410 or users. The virtual sensor management module 452, when controlling the return of results of the retrieval of sensor data from the storage system 440, may apply the limiting criteria to determine whether those portions of sensor data coming from sources having limiting criteria should be included in the results based on the limiting criteria and the parameters of the request, including the source of the request, e.g., application 410 and/or user. As noted above, such limiting criteria as well as other parameters associated with the sensor data that may aid in the searching and retrieval of sensor data corresponding to application 410 requests may be stored in association with the sensor data in the storage system 440.

The storage system 440 maintains current sensor data obtained from the physical sensors 462, 472, and 482 via corresponding sensor APIs 430-434, as well as historic sensor data as storage space permits. The storage system 440 accepts sensor data from a variety of different sensors of a variety of different sensor types. Again, the sensor data may be obtained from a variety of different sensor types in a variety of different formats via the standard APIs 430-434, but may store the received data in a uniform standard format within the storage system 440 of the Sensor Cloud 450 for ease of retrieval. The variety of different sensors 462, 472, and 482 may have overlapping sensor data. Such redundancy can be leveraged by the Sensor Cloud 450 to detect sensors 462, 472, or 482 that appear to be unreliable based on comparison with nearby sensors of a same type, where nearby may be determined based on, for example, sensors being in a same environment 460-480 or environments that are in close proximity to each other. In addition, the virtual sensor management module 452, storage system 440, or other mechanism of the Sensor Cloud 450 can provide a thinning function to remove or compress redundant data from sensors 462, 472, and 482.

Thus, as discussed above, with these mechanisms of the Sensor Cloud 450, sensor data from a variety of different physical sensors 462, 472, and 482 associated with the same or different environments 460-480 comprising data processing devices, electronic devices, or the like, may be received into the Sensor Cloud 450 and used to represent data output by virtualized sensors, as defined by virtual sensor APIs 420-424. Applicants may request sensor data from the Sensor Cloud 450 without specifying a particular physical sensor 462, 472, or 482, from which the data is to be retrieved. Standardized virtual sensor APIs 420-424 permit such communication between applications 410 and the Sensor Cloud 450 as well as communication between the physical sensors 462, 472, and 482 and the Sensor Cloud 450 via sensor APIs 430-434. A standardized organized storage system 440 permits the virtual sensor APIs 420-424 to access sensor data obtained from a variety of different physical sensors 462, 472, and 482 in a uniform manner. As a result, the mechanisms of the illustrative embodiments provide a true virtualized sensor mechanism in which applications are not as susceptible to unavailability of particular physical sensors. With the mechanisms of the illustrative embodiments, the virtual sensors are defined internal to the Sensor Cloud 450, such as by the virtual sensor APIs 420-424, and not specified as filter conditions by the particular applications 410 requesting the sensor data.

Figure 5:
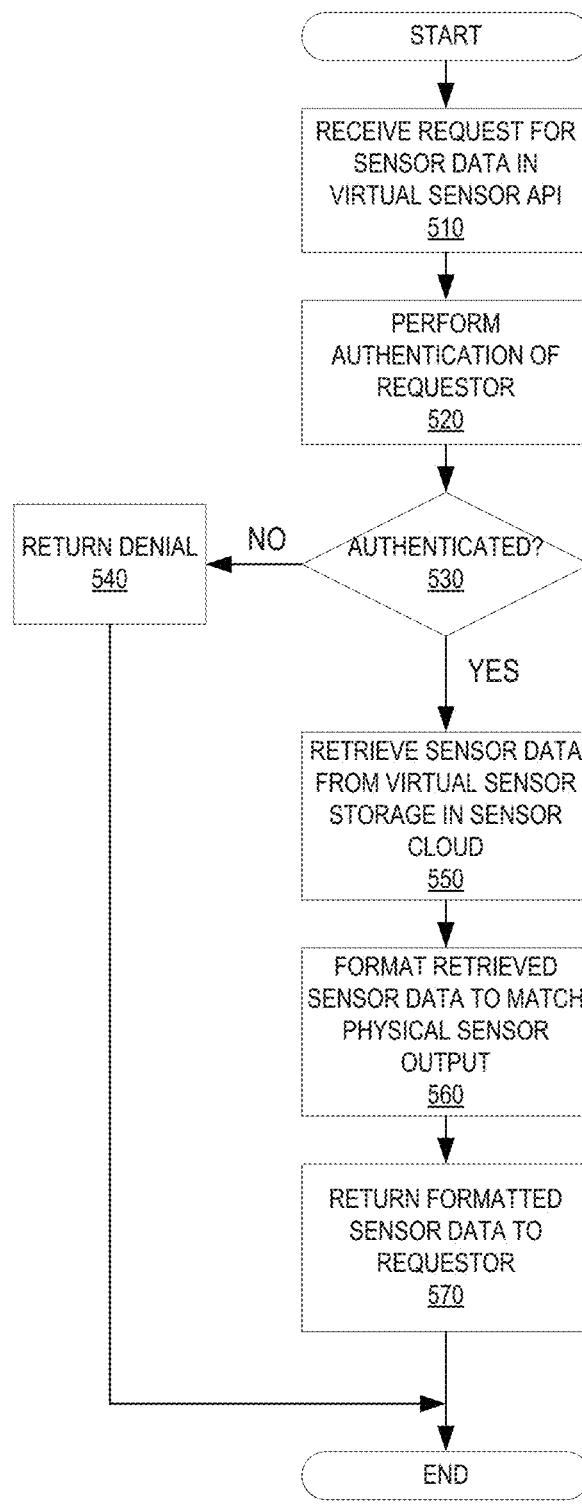
FIG. 5 is a flowchart outlining an example operation for handling a request from an application for sensor data using a Sensor Cloud in accordance with one illustrative embodiment.

FIG. 5 is a flowchart outlining an example operation for handling a request from an application for sensor data using a Sensor Cloud in accordance with one illustrative embodiment. The operation outlined in FIG. 5 may be implemented, for example, by a virtual sensor management module either itself or in combination with other Sensor Cloud logic provided, for example, in association with a sensor data storage system of the Sensor Cloud. It is assumed in the operation of FIG. 5 that sensor data has already been collected from physical sensors using one or more sensor APIs of the Sensor Cloud, processed by the virtual sensor management module, and stored in the sensor data storage system such that it may be retrieved in response to requests from applications directed to the Sensor Cloud.

As shown in FIG. 5, the operation starts with receiving a request for sensor data in a virtual sensor API of the Sensor Cloud, the virtual sensor API being a virtual sensor API for the particular type of sensor data requested (step 510). The request may specify the type of sensor data desired, any parameters for identifying the particular sensor data of interest, as well as information about the requesting application, the user of the requesting application, and the like. Based on the identification of the requesting application and/or user, an authentication of the requestor is performed (step 520). If the requestor is not authenticated (step 530) and cannot access the requested sensor data, then access to the requested sensor data is denied (step 540).

If the requestor is authenticated (step 530), then the requested sensor data is retrieved from the virtual sensor storage of the Sensor Cloud in accordance with the parameters specified in the request (step 550). The retrieved sensor data is then formatted as requested in the in the original request and to further match the actual output that would be expected from an actual physical sensor providing the type of sensor data requested (step 560). The formatted sensor data is then returned to the requestor (step 570). The operation then terminates.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for virtualizing physical sensors and providing sensor data to a requestor using the virtualized physical sensors, the method comprising:
   obtaining, in the data processing system, sensor data from a plurality of physical sensors;
   storing the sensor data in a virtual sensor storage system of the data processing system in at least one standardized format;
   receiving, in the virtual sensor storage system, a request from a requestor for a first type of sensor data, wherein the request does not specify a particular physical sensor;
   retrieving, by the virtual sensor storage system, a portion of the sensor data stored in the virtual sensor storage system in response to receiving the request, wherein the portion of sensor data corresponds to the type of sensor data requested in the request from the requestor; and
   returning, by the virtual sensor storage system, the retrieved portion of the sensor data to the requestor in a format corresponding to a physical sensor configured to provide the requested type of sensor data, wherein the sensor data is obtained via one or more standardized application programming interfaces (APIs) with which the plurality of physical sensors communicate and which communicate data to the virtual sensor storage system, and wherein the one or more standardized APIs comprises at least one first standardized API for communication with a first type of physical sensor in the plurality of physical sensors, and at least one second standardized API for communication with a second type of physical sensor in the plurality of physical sensors, the first type of physical sensor being different than the second type of physical sensor, and the at least one first standardized API is different from the at least one second standardized API.

2. The method of claim 1, wherein the virtual sensor storage system comprises a cloud based storage system comprising a plurality of storage devices coupled to one another via at least one network and represented as a single virtual sensor storage system to the requestor requesting sensor data from the virtual sensor storage system.

3. The method of claim 1, wherein the plurality of physical sensors comprise a plurality of physical sensors of different types associated with different data processing devices and which sense different types of sensor data.

4. The method of claim 1, further comprising:
   comparing sensor data from a subset of physical sensors in the plurality of physical sensors whose sensor data overlaps; and
   identifying if there is a faulty physical sensor in the subset of physical sensors based on results of the comparison.

5. The method of claim 1, wherein retrieving a portion of the sensor data stored in the virtual sensor storage system in response to receiving the request further comprises:
   determining if there is a constraint associated with the portion of the sensor data, wherein the constraint specifies a limitation on which requestors may be provided the portion of the sensor data;
   determining if the requestor satisfies a condition of the constraint; and
   retrieving the portion of the sensor data only in response to the requestor not satisfying a condition of the constraint.

6. The method of claim 1, wherein retrieving a portion of the sensor data stored in the virtual sensor storage system in response to receiving the request comprises:
    retrieving sensor data obtained from more than one physical sensor in the plurality of physical sensors based on the type of sensor data requested in the request and criteria specified in the request; and
    combining the sensor data from the more than one physical sensor into a single resultant set of sensor data representing a sensor output of a single virtual sensor, and wherein returning the retrieved portion of the sensor data to the requestor comprises returning the single resultant set of sensor data to the requestor as the sensor output of the single virtual sensor.

7. The method of claim 1, wherein the sensor data is obtained by identifying a constraint associated with a subset of the sensor data as specified by a supplier of the subset of the sensor data, and wherein the sensor data is stored in the virtual sensor storage system at least by storing an identification of the constraint in association with the subset of the sensor data in the virtual sensor storage system, wherein the constraint specifies a limitation as to which requestors may be provided the associated subset of the sensor data.

8. A computer program product comprising a non-transitory computer readable storage medium having a computer readable program stored therein, wherein the computer readable program, when executed on a data processing system, causes the data processing system to:
    obtain sensor data from a plurality of physical sensors;
    store the sensor data in a virtual sensor storage system of the data processing system in at least one standardized format;
    receive a request from a requestor for a first type of sensor data, wherein the request does not specify a particular physical sensor;
    retrieve a portion of the sensor data stored in the virtual sensor storage system in response to receiving the request, wherein the portion of sensor data corresponds to the type of sensor data requested in the request from the requestor; and
    return the retrieved portion of the sensor data to the requestor in a format corresponding to a physical sensor configured to provide the requested type of sensor data, wherein the sensor data is obtained via one or more standardized application programming interfaces (APIs) with which the plurality of physical sensors communicate and which communicate data to the virtual sensor storage system, and wherein the one or more standardized APIs comprises at least one first standardized API for communication with a first type of physical sensor in the plurality of physical sensors, and at least one second standardized API for communication with a second type of physical sensor in the plurality of physical sensors, the first type of physical sensor being different than the second type of physical sensor, and the at least one first standardized API is different from the at least one second standardized API.

9. The computer program product of claim 8, wherein the virtual sensor storage system comprises a cloud based storage system comprising a plurality of storage devices coupled to one another via at least one network and represented as a single virtual sensor storage system to the requestor requesting sensor data from the virtual sensor storage system.

10. The computer program product of claim 8, wherein the plurality of physical sensors comprise a plurality of physical sensors of different types associated with different data processing devices and which sense different types of sensor data.

11. The computer program product of claim 8, wherein the computer readable program further causes the data processing system to:
    compare sensor data from a subset of physical sensors in the plurality of physical sensors whose sensor data overlaps; and
    identify if there is a faulty physical sensor in the subset of physical sensors based on results of the comparison.

12. The computer program product of claim 8, wherein the computer readable program causes the data processing system to obtain sensor data by identifying a constraint associated with a subset of the sensor data as specified by a supplier of the subset of the sensor data, and wherein the computer readable program further causes the data processing system to store the sensor data in the virtual sensor storage system at least by storing an identification of the constraint in association with the subset of the sensor data in the virtual sensor storage system, wherein the constraint specifies a limitation as to which requestors may be provided the associated subset of the sensor data.

13. The computer program product of claim 8, wherein the computer readable program causes the data processing system to retrieve a portion of the sensor data stored in the virtual sensor storage system in response to receiving the request further by:
    determining if there is a constraint associated with the portion of the sensor data, wherein the constraint specifies a limitation on which requestors may be provided the portion of the sensor data;
    determining if the requestor satisfies a condition of the constraint; and
    retrieving the portion of the sensor data only in response to the requestor not satisfying a condition of the constraint.

14. The computer program product of claim 8, wherein the computer readable program causes the data processing system to retrieve a portion of the sensor data stored in the virtual sensor storage system in response to receiving the request by:
    retrieving sensor data obtained from more than one physical sensor in the plurality of physical sensors based on the type of sensor data requested in the request and criteria specified in the request; and
    combining the sensor data from the more than one physical sensor into a single resultant set of sensor data representing a sensor output of a single virtual sensor, and wherein returning the retrieved portion of the sensor data to the requestor comprises returning the single resultant set of sensor data to the requestor as the sensor output of the single virtual sensor.

15. An apparatus, comprising:
    a processor; and
    a memory coupled to the processor, wherein the memory comprises instructions which, when executed by the processor, cause the processor to:
    obtain sensor data from a plurality of physical sensors;
    store the sensor data in a virtual sensor storage system of the data processing system in at least one standardized format;
    receive a request from a requestor for a first type of sensor data, wherein the request does not specify a particular physical sensor;
    retrieve a portion of the sensor data stored in the virtual sensor storage system in response to receiving the request, wherein the portion of sensor data corresponds to the type of sensor data requested in the request from the requestor; and return the retrieved portion of the sensor data to the requestor in a format corresponding to a physical sensor configured to provide the requested type of sensor data, wherein the sensor data is obtained via one or more standardized application programming interfaces (APIs) with which the plurality of physical sensors communicate and which communicate data to the virtual sensor storage system, and wherein the one or more standardized APIs comprises at least one first standardized API for communication with a first type of physical sensor in the plurality of physical sensors, and at least one second standardized API for communication with a second type of physical sensor in the plurality of physical sensors, the first type of physical sensor being different than the second type of physical sensor, and the at least one first standardized API is different from the at least one second standardized API.

\* \* \* \* \*